Patented Sept. 13, 1938

2,130,321

UNITED STATES PATENT OFFICE 2,130,321

STABILIZATION OF SULPHUR-CONTAINING COMPOUNDS AND SYSTEMS

Morris S. Kharasch, Chicago, Ill., assignor to Eli Lilly and Company, Indianapolis, Ind., a corporation of Indiana No Drawing. Application May 14, 1934, Serial No. 725,482

11 Claims. (Cl. 23—250)

It is the object of my invention to stabilize against oxidation by oxygen those compounds in which such oxidation is catalyzed by the presence of ions of copper, manganese, and iron; and especially compounds of that type which contain sulphur.

Many compounds containing sulphur are restricted in their usefulness by their tendency to be oxidized by oxygen, and the consequent formation of undesirable products; and to have that oxidation catalyzed tremendously by the presence of the metal ions mentioned—copper, manganese, and iron. It is to a stabilization and improvement of those compounds that my present invention is generically directed.

I have discovered that this catalysis may be largely if not wholly inhibited by the presence of an aliphatic diamine, preferably an aliphatic 1,2-diamine; and that such inhibition may be obtained by having the aliphatic diamine present either as a separate added ingredient or as part of the compound being stabilized or of a co-present compound. That is, the aliphatic diamines may be either added ingredients initially separate from the compound to be stabilized, and either diamines per se or parts of compounds which contain such diamines, or may be initially part of the compound to be stabilized. Therefore, when in my claims I state that a diamine is present in the solution, I intend to include all of these situations; because they are in effect generically the same.

Various aliphatic diamines may be used for the stabilization contemplated by my invention, including the following:

a. 1,2-ethylenediamine,
b. 1,2-propylenediamine,
c. N-phenylethylenediamine, (1) $$C_6H_5-\underset{\underset{H}{|}}{N}-CH_2-CH_2-NH_2$$

d. 1,2-butylenediamine,
e. 1,3-propylenediamine,
f. Condensation products of the diamines with aldehydes, and
g. Salts of the diamines, especially with weak acids.

Of these various diamines, I prefer the 1,2-diamines, especially 1,2-ethylenediamine and 1,2-propylenediamine.

The aliphatic diamine probably exerts its inhibiting action by forming extremely stable complexes with the metallic ions, of copper, manganese, and iron, and by thus preventing such ions from exerting their catalytic effect.

My invention is of broad scope, for sulphur-containing compounds of many different types are sensitive to catalysis by these metal ions, and I intend to include in the present invention all such compounds containing sulphur.

As illustrations of this broad scope of my invention, I give below a number of examples, which are merely illustrative and are not given as limitations of that broad scope. These illustrative examples show that the stabilization by such an aliphatic diamine is accomplished in both organic and inorganic compounds which are sensitive to this catalysis; and fall into several general classes and sub-classes, as follows:

I. Inorganic compounds — tetravalent-sulphur salts, by which I include sulphites and hyposulphites, which although included under the generic claims of the present application are claimed specifically in my co-pending application Serial No. 725,483, filed May 14, 1934.
   A. Sulphites:
      1. Sodium sulphite,
      2. Potassium sulphite,
      3. Ammonium sulphite,
      4. Other sulphites in which the metal ions of copper, manganese, and iron tend to catalyze oxidation by oxygen,
      5. Inherently stable sulphites, in which the aliphatic 1,2-diamine is the base portion of the sulphite.
   B. Hyposulphites (hydrosulphites):
      1. Sodium hyposulphite ($Na_2S_2O_4$, commonly known in the trade as sodium hydrosulphite),
      2. Potassium hyposulphite,
      3. Other hyposulphites in which said metal ions tend to catalyze oxidation by oxygen,
      4. Inherently stable hyposulphites, in which the 1,2-aliphatic diamine is the base portion of the hyposulphite.

II. Organic thiol compounds:
   A. Compounds of the following general formula:

(2) 

in which R is either hydrogen, or a metal of the class consisting of mercury, arsenic, antimony, and bismuth, or an organo-metallic group stable toward water and including a metal of such class joined by one valence bond to the sulphur atom; and $R_{Ac}$ is an organic-acid group having a carbon atom bonded directly to the sulphur atom and including either hydrogen to form the acid or an alkali metal or an alkaline-earth metal or ammonium or a substituted ammonium to form the corresponding salt or $NH_2$ to form the corresponding amide. Examples of this sub-class are:

1. Compounds represented by the following formula:

(3)     H—S—R$_{Ac}$ in which R$_{Ac}$ has the same significance as before.

2. Compounds represented by the following formula:

(4)     Me—S—R$_{Ac}$ in which R$_{Ac}$ has the same significance as before, and Me indicates a metal of the class consisting of mercury, arsenic, antimony, and bismuth joined by one or more valence bonds to the radical —S—R$_{Ac}$ and having any remaining valence bonds satisfied in any desired manner.

These organic compounds may be subdivided into the following classes:

a. Certain alkyl and alicyclic mercuric sulphur compounds in which the R of Formula 2 above is bivalent mercury joined by one valence bond to the sulphur atom and by the other to an alkyl or alicyclic radical, of the general type shown in my Patent No. 1,672,615, granted June 5, 1928. The stabilization of these compounds, although included under the generic claims of the present application, is specifically claimed in my co-pending application Serial No. 711,822, filed February 17, 1934, now Patent No. 2,012,820, granted August 27, 1935.

b. Certain mercuric sulphur compounds in which the R of Formula 2 above is bivalent mercury having each of its valence bonds attached to a —S—R$_{Ac}$ group of Formula 2.

c. Certain arsenous, antimonous, and bismuthous sulphur compounds in which the R of Formula 2 above its trivalent arsenic, antimony, or bismuth, having one or more of its valence bonds attached to the —S—R$_{Ac}$ group of Formula 2.

I will discuss some of these examples separately.

*Class I, sub-class A*

1. Sodium sulphite has many uses, both in itself and as a stabilizer of unstable systems, but of itself is quite unstable toward oxidation by oxygen of the air, especially in the presence of the metal ions of copper, manganese, and iron. The measure of its deterioration by oxidation can be followed by its loss in iodine titre. The stabilization of sodium-sulphite solutions against metal catalysis by added 1,2-ethylenediamine is shown in the following Tables I and II:

TABLE I

*Stabilization of sodium sulphite solutions by the addition of 1,2-ethylenediamine*

Concentration of sodium sulphite—1:1000.
Concentration of added copper ions, when copper is added—1:200,000.
Iodine titre given in cc. of 0.015N iodine solution per 5 cc. of sodium-sulphite solution. The accuracy of the iodine titrations is + 0.2 cc.

| Ethylenediamine added | Solution | Iodine titre | | |
|---|---|---|---|---|
| | | Original | Later — after time indicated | After 10 days |
| None. | Sodium sulphite. | 4.54 | 2.91 (2 hrs.). 0.00 (3 days). | ...... |
| | Sodium sulphite+copper sulphate. | 4.45 | 0.30 (8 hrs.). | ...... |
| None. | Sodium sulphite+NaOH to give pH 9. | 3.74 | 1.68 (2 hrs.). 0.00 (2 days). | ...... |
| | Sodium sulphite+NaOH to give pH 9+copper sulphate. | 3.28 | 0.00 (2 days). | ...... |
| None. | Sodium sulphite+NH$_4$OH (5 drops per 500 cc.). | 4.33 | 3.86 (4 hrs.). 2.27 (22 hrs.). | ...... |
| | Sodium sulphite+NH$_4$OH (5 drops per 500 cc.)+copper sulphate. | 2.77 | 1.71 (4 hrs.). 0.06 (22 hrs.). | ...... |
| Ethylenediamine to give pH 9. | Sodium sulphite. | 4.50 | 4.37 (3 days). | 3.89 |
| | Sodium sulphite+copper sulphate. | 4.45 | 3.30 (3 days). | 1.01 |
| Ethylenediamine in excess (5 drops per 500 cc.). | Sodium sulphite. | 4.41 | 4.43 (3 days). | 4.41 |
| | Sodium sulphite+copper sulphate. | 4.45 | 4.30 (3 days). | 4.19 |

TABLE II

*Relative effects of copper, manganese, and iron on rate of oxidation of sodium sulphite, alkalinized with sodium hydroxide and with 1,2-ethylenediamine respectively*

Concentration of sodium sulphite—1:1000.
Concentration of sodium hydroxide, when used, is to give pH 9.
Concentration of ethylenediamine, when used, is 5 drops per 500 cc., which gives in excess of pH 9.

Iodine titre is given in cc. of 0.015N-iodine solution per 5 cc. of sodium-sulphite solution. The accuracy of the iodine titrations is ± 0.2 cc.

| Added metal ions | Sodium sulphite solution | Iodine titre | |
|---|---|---|---|
| | | Original | After 20 hours |
| None. | With added NaOH. | 2.43 | 0.10 |
| | With added ethylenediamine. | 4.59 | 4.60 |
| $Cu^{++}$ 1:200,000. | With added NaOH. | 4.30 | 0.06 |
| | With added ethylenediamine. | 4.45 | 4.30 (After 67 hours) |
| $Mn^{++}$ 1:200,000. | With added NaOH. | 3.41 | 1.13 |
| | With added ethylenediamine. | 4.37 | 3.87 |
| $Fe^{++}$ 1:50,000. | With added NaOH. | 2.70 | 0.96 |
| | With added ethylenediamine. | 4.34 | 4.31 |

The stabilization of sodium sulphite by added 1,2-propylenediamine and by added N-phenylethylenediamine, in contrast to that produced by ethanolamine (which also has some stabilizing effect), is shown in the following Table III:

TABLE III

*Stabilization of sodium sulphite solutions by the addition of ethanolamine, 1,2-propylenediamine, and N-phenylethylenediamine*

Concentration of sodium sulphite—1:1000.
Concentration of added copper ions, when copper is added—1:200,000.
Iodine titre given in cc. of 0.015N iodine solution per 5 cc. of sodium-sulphite solution. The accuracy of the iodine titrations is ±0.2 cc.
Concentration of added stabilizer—5 drops per 500 cc.

| Added stabilizer | Solution | Iodine titre | | | |
|---|---|---|---|---|---|
| | | Original | After 24 hours | After 48 hours | After 120 hours |
| None. | Sodium sulphite + NaOH to give pH 9. | 4.65 | 0.21 | | |
| | Sodium sulphite + NaOH to give pH 9 + copper sulphate. | 2.23 | 1.10 | | |
| Ethanolamine. | Sodium sulphite. | 4.65 | 4.33 | 4.25 | 4.12 |
| | Sodium sulphite + copper sulphate. | 4.46 | 3.35 | 1.71 | 0.00 |
| 1,2-propylenediamine. | Sodium sulphite. | 4.50 | 4.53 | 4.37 | 4.25 |
| | Sodium sulphite + copper sulphate. | 4.48 | 4.50 | 4.33 | 4.10 |
| N-phenylethylene diamine. | Sodium sulphite. | 4.67 | 3.92 | 3.10 | 1.73 |
| | Sodium sulphite + copper sulphate. | 4.40 | 3.16 | 1.99 | 0.56 |

Similar effects are obtainable on other sulphites, as of potassium.

*Class I, sub-class B*

1. Sodium hyposulphite, like sodium sulphite, has various uses, both in itself and as a stabilizer of unstable systems, but of itself is also quite unstable toward oxidation by oxygen of the air, especially in the presence of the metal ions of copper, manganese, and iron. The measure of its deterioration by oxidation can also be followed by its loss in iodine titre.

The stabilization of sodium hyposulphite ($Na_2S_2O_4$) by ethylenediamine in the presence of copper ions is shown by the following Table IV:

TABLE IV

*Effect of copper on rate of oxidation of sodium hyposulphite alkalinized with sodium hydroxide and with ethylenediamine respectively*

Concentration of sodium sulphite—1:1000.
Concentration of added copper ions—1:200,000.
Iodine titre given in cc. of 0.015N iodine solution per 5 cc. of sodium-sulphite solution. The accuracy of the iodine titrations is ±0.2 cc.

| Solution | Iodine titre | | | |
|---|---|---|---|---|
| | Original | After bubbling air through— | | After standing 18 hours |
| | | For 2 hours | For 5 hours | |
| Sodium hyposulphite+$CuSO_4$+NaOH to give pH 9.6 | 4.05 | 3.80 | 0.10 | 0.10 |
| Sodium hyposulphite+$CuSO_4$+ethylenediamine to give pH 9.6 | 4.08 | 4.07 | 4.04 | 4.15 |

Similar effects are obtainable on other hyposulphites, as of potassium, etc.

This effect of aliphatic 1,2-diamines in stabilizing compounds against these metal catalysts persists in condensation products of such diamines with aldehydes—such as acetaldehyde, vanillin, salicylic aldehyde, isobutyraldehyde, etc. This stabilization effect on sodium sulphite by these condensation products is illustrated in the following Table V:

TABLE V

*Stabilization of sodium sulphite solutions by condensation products of 1,2-diamines and aldehydes*

Concentration of sodium sulphite—1:1000.
Concentration of added copper ions—1:200,000.
Concentration of diamine-aldehyde concentration products—1:1000.
Iodine titre given in cc. of 0.015N iodine solution per 5 cc. of sodium-sulphite solution. The accuracy of the iodine titrations is ±0.2 cc.

| Solution | Iodine titre | |
|---|---|---|
| | Original | After 20 hours |
| Sodium sulphite | 4.20 | 0.10 |
| Sodium sulphite+condensation product of ethylenediamine with acetaldehyde | 5.10 | 4.75 |
| Sodium sulphite+condensation product of propylenediamine with salicylic aldehyde | 4.90 | 4.34 |

Such condensation products of 1,2-diamines with aldehydes may be obtained in various ways. A convenient way is by treating an ether solution of the aldehyde with the desired diamine, such as ethylenediamine. In some cases a solid separates out, as in the case of propylenediamine with salicylic aldehyde. This last-mentioned compound is a bright yellow solid, which melts at 118°–123° C. Ethylenediamine and salicylic aldehyde also yield a bright yellow solid, which melts at about 125° C. Ethylenediamine and acetaldehyde yield a white solid, which melts at about 108° C.

In all of these stabilizations, the aliphatic diamine probably exerts its inhibiting or stabilizing action by forming extremely stable complexes with the metallic ions, as of copper, manganese, and iron, and by thus preventing such ions from exerting their catalytic effect.

Such condensation product may be used effectively to stabilize other sulphites, as of potassium, etc.; and also to stabilize various hyposulphites, as of sodium, potassium, etc.

*Class I, sub-classes A and B, species 5*

In the preceding Tables I to V inclusive, the stabilization has been initially of an existing sulphite or hyposulphite with a 1,2-diamine which was not part of the salt molecule. It is possible, however, to prepare a new and inherently stable type of tetravalent-sulphur salt—sulphite or hyposulphite—from the aliphatic diamines, whereby the diamine enters into the salt molecule; and to use such inherently stable diamine tetravalent-sulphur salts for the same purposes for which other sulphites and hyposulphites are used, with the added advantage of inherent stability. These diamine tetravalent-sulphur salts are stable even in the presence of the metal ion catalysts of copper, manganese, and iron, and even in a solution which is neutral or slightly alkaline—a property which is unique for tetravalent-sulphur salts.

These diamine salts may be prepared in various ways. The diamine sulphites may be prepared by causing the desired diamine to react with sulphur dioxide or sulphurous acid; and the diamine hyposulphites by electrolytic reduction of the diamine sulphites.

An example of these diamine salts is ethylenediamine sulphite. It is perhaps most simply prepared by passing sulphur dioxide into either an absolute or aqueous alcoholic solution of 1,2-ethylenediamine or into an acetone solution of such diamine; upon which the salt separates in solid form.

Ethylenediamine sulphite melts at 173–175° C. with decomposition. It is white, and quite soluble in water. The water solution is about pH 6.7. The analysis of the salt for nitrogen and sulphur indicates that it contains one mole of ethylenediamine to one mole of sulphurous acid. It is quite stable against metal catalysts, and is very effective as a stabilizer of those easily oxidizable benzenoid compounds which are unstable in the presence of ions of copper, manganese, or iron. It probably has the following formula:

(5) 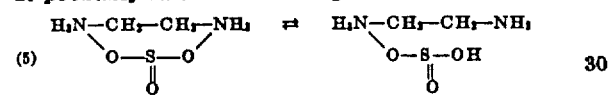

Another example is propylenediamine sulphite. It may be prepared analogously to ethylenediamine sulphite; and is similar thereto in most respects. It melts at 162° C., with decomposition. It also is quite stable against metal catalysts, and effective as a stabilizer of these benzenoid compounds.

Ethylenediamine hyposulphite may be obtained by reducing ethylenediamine sulphite.

These inherently stable sulphites or hyposulphites act substantially like my stabilized sodium sulphite and hyposulphite, to stabilize unstable systems. Thus ethylenediamine sulphite is substantially as effective as a stabilizer of these systems as is my stabilized sodium sulphite.

*Class II, sub-class A*

1. Among the organic thio compounds which may be stabilized by the aliphatic 1,2-diamines, are the following:

a. Cysteine, which has the following formula:

(6) $\quad HSCH_2CH(NH_2)COOH$ b. Thiosalicylic acid, which has the following formula:

(7) 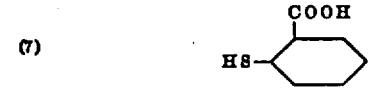

c. Thioglycollic acid, which has the following formula:

(8) $\quad HSCH_2COOH$ d. p-Thiobenzene sulphonic acid, which has the following formula:

(9) 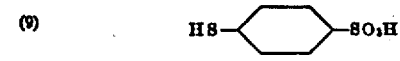

These acids, and their salts, may all be stabilized against oxidation of the SH group, under metal-ion catalysts, by the presence of the aliphatic 1,2-diamines. If it is the salts of these acids, such as sodium salts, which are to be stabilized, the aliphatic 1,2-diamine may be added directly to a solution of such salt. Alternatively, the aliphatic 1,2-diamine may be added directly to the acid, in which case a diamine salt of the acid is formed. In this stabilization, it is necessary that the hydrogen ion concentration be taken into account, so that the solution is not strongly acid and is desirably either approximately neutral or alkaline.

2. Among the metallo-thio compounds which may be stabilized by the aliphatic diamines are the following:

a. Mercurithiosalicylic acid, having the following formula:

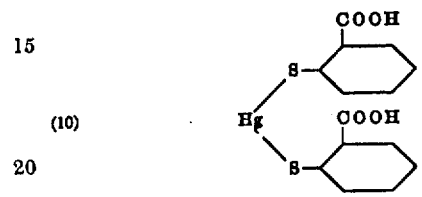
(10)

b. Sodium mercurithiosalicylate, having the following formula:

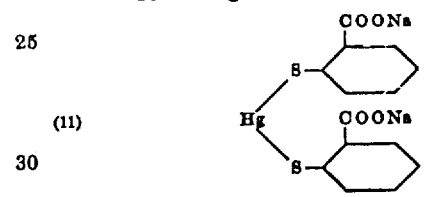
(11)

c. Mercurithioglycollic acid, having the following formula:

(12)     $Hg(SCH_2COOH)_2$ d. Sodium mercurithioglycollate, having the following formula:

(13)     $Hg(SCH_2COONa)_2$ e. Mercuri-p-thiophenyl acetic acid, having the following formula:

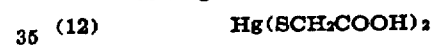
(14)

f. Sodium mercuri-p-thiophenyl acetate, having the following formula:

(15)

g. Arsenous-thioglycollic acid, having the following formula:

(16)     $As(SCH_2COOH)_3$ h. Sodium arsenous-thioglycollate, having the following formula:

(17)     $As(SCH_2COONa)_3$ i. Arsenous-thiosalicylic acid, having the following formula:

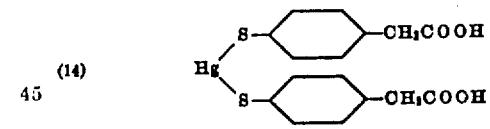
(18)

j. Sodium arsenous-thiosalicylate, having the following formula:

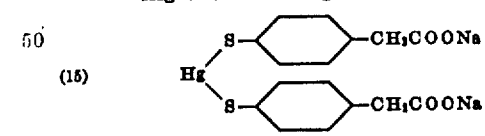
(19)

k. Sodium antimonous-thioglycollate, having the following formula:

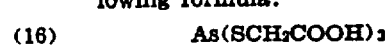
(20)

l. Antimonous thioglycollamide, having the following formula:

(21)     $Sb(SCH_2CONH_2)_3$ m. Sodium bismuthous-thioglycollate, having the following formula:

(22)     $Bi(SCH_2COONa)_3$

These may be stabilized against oxidation, as in the case of the other compounds, either by having the aliphatic diamine as part of the compound or by having it merely as an added ingredient. When the diamine is part of the compound, it reacts with the acid to form a diamine salt; but when the compound to be stabilized is already a salt, the diamine may be merely co-present in solution.

3. Among the alkyl and alicyclic mercuric sulphur compounds in which the R of Formula 2 or the Me of Formula 4 above is mercury joined by one valence bond to the sulphur atom and by the other to an alkyl or alicyclic radical, included generically in this application but claimed specifically in my aforesaid co-pending application Serial No. 711,822, are the following:

a. Ethylmercurithiosalicylic acid;
b. Sodium ethylmercurithiosalicylate;
c. Cyclohexylmercuri-β-thiopropionic acid;
d. Sodium cyclohexylmercuri-β-thiopropionate;
e. Methylmercurithioglycollic acid;
f. Sodium methylmercurithioglycollate;
g. Methylmercuri-p-thiobenzenesulphonic acid;
h. Sodium methylmercuri-p-thiobenzenesulphonate;
i. Butylmercurithiosalicylic acid; and
j. Sodium butylmercurithiosalicylate.

In all the salts which have been mentioned, other alkali metals or an alkaline-earth metal or ammonium or a substituted ammonium may be used instead of sodium.

In addition, amides may be formed from certain of the acids, as illustrated for instance by ethyl mercuri-p-thiobenzene sulphonamide, which has the following formula:

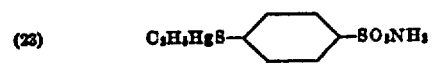
(23)

In stabilizing compounds of this type, they are dissolved in solutions containing the desired aliphatic diamine, or the desired aliphatic diamine is added to a solution of the compound if the compound is soluble. In the case of the acids, the aliphatic diamine reacts with the acid to form a salt; of which an example is ethylenediamine ethyl mercuri-thiosalicylate, the formula of which is probably either

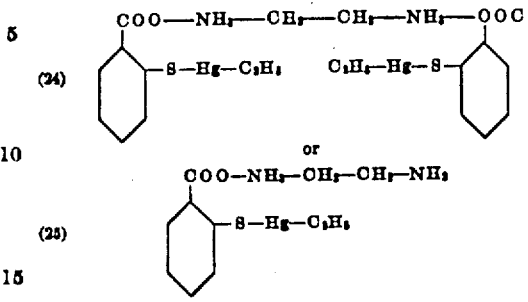

No exact quantity of the aliphatic 1,2-diamine is necessary in any of these stabilizations; save of course that in forming diamine salts it is necessary to have enough of the diamine, and often desirable to have some excess beyond a molecular equivalent. I have been able to obtain effective stabilizations with the amount of aliphatic diamine varying from as much as 50 moles thereof, to as little as one-half mole thereof in some instances. But the antimonous compounds, however, seem to require a little more of the diamine than do the other diamines for effective stabilization; and therefore I prefer to use an excess of the aliphatic 1,2-diamine, in terms of molecular equivalents in stabilizing antimonous compounds.

Instead of stabilizing by adding the diamines themselves, or condensation products thereof with aldehydes, I may also use known salts of the diamines, such for instance as the acetate, carbonate, or the tartrate. In general, if such salts are used, it is preferable that they be diamine salts of rather weak acids. With some of the compounds outlined above, it is essential to maintain the hydrogen ion concentration within a proper range, in order to get effective stabilization. This range differs for the different compounds.

I claim as my invention:

1. The process of stabilizing against oxidation by oxygen a solution of a sulphur-containing compound in which otherwise such oxidation is catalyzed by the presence of ions of copper, manganese or iron; which consists in adding an aliphatic 1,2-diamine to the solution.

2. The process of stabilizing against oxidation by oxygen a solution of a sulphur-containing compound in which otherwise such oxidation is catalyzed by the presence of ions of copper, manganese, or iron; which consists in adding ethylenediamine to the solution.

3. A solution of a sulphur-containing compound in which oxidation by oxygen tends to be catalyzed by the presence of ions of copper, manganese, and iron, which solution contains an aliphatic 1,2-diamine to stabilize it against such oxidation.

4. A solution of a sulphur-containing compound in which oxidation by oxygen tends to be catalyzed by the presence of ions of copper, manganese, and iron, which solution contains an uncombined aliphatic 1,2-diamine to stabilize it against such oxidation.

5. A solution of a sulphur-containing compound in which oxidation by oxygen tends to be catalyzed by the presence of ions of copper, manganese, and iron, which solution contains ethylenediamine to stabilize it against such oxidation.

6. A solution of a sulphur-containing compound in which oxidation by oxygen tends to be catalyzed by the presence of ions of copper, manganese, and iron, which solution contains uncombined ethylenediamine to stabilize it against such oxidation.

7. A solution of a sulphur-containing compound in which oxidation by oxygen tends to be catalyzed by the presence of ions of copper, manganese, and iron, in which solution an aliphatic 1,2-diamine is present in the form of a salt.

8. A solution of a sulphur-containing compound in which oxidation by oxygen tends to be catalyzed by the presence of ions of copper, manganese, and iron, in which solution ethylenediamine is present in the form of a salt.

9. The process of stabilizing sodium arsenous-thioglycollate against oxidation by oxygen, which consists in adding an aliphatic 1,2-diamine thereto.

10. The process of stabilizing antimonous thioglycollamide against oxidation by oxygen, which consists in adding an aliphatic 1,2-diamine thereto.

11. The process of stabilizing sodium bismuthous thioglycollate against oxidation by oxygen, which consists in adding an aliphatic 1,2-diamine thereto.

MORRIS S. KHARASCH.

CERTIFICATE OF CORRECTION.

Patent No. 2,130,321. September 13, 1938.

MORRIS S. KHARASCH.

It is hereby certified that error appears in the printed specification of the above numbered patent requiring correction as follows: Page 2, first column, line 1, beginning with the numeral and words "1. Compounds represented" strike out all to and including the table ending in line 75, second column of page 3, and insert instead the following:

1. Compounds represented by the following formula:

(3)     H—S—$R_{Ao}$ in which $R_{Ao}$ has the same significance as before.

2. Compounds represented by the following formula:

(4)     Me—S—$R_{Ao}$ in which $R_{Ao}$ has the same significance as before, and Me indicates a metal of the class consisting of mercury, arsenic, antimony, and bismuth joined by one or more valence bonds to the radical —S—$R_{Ao}$ and having any remaining valence bonds satisfied in any desired manner.

These organic compounds may be subdivided into the following classes:

a. Certain alkyl and alicyclic mercuric sulphur compounds in which the R of Formula 2 above is bivalent mercury joined by one valence bond to the sulphur atom and by the other to an alkyl or alicyclic radical, of the general type shown in my Patent No. 1,672,615, granted June 5, 1928. The stabilization of these compounds, although included under the generic claims of the present application, is specifically claimed in my co-pending application Serial No. 711,822, filed February 17, 1934, now Patent No. 2,012,820, granted August 27, 1935.

b. Certain mercuric sulphur compounds in which the R of Formula 2 above is bivalent mercury having each of its valence bonds attached to a —S—$R_{Ao}$ group of Formula 2.

c. Certain arsenous, antimonous, and bismuthous sulphur compounds in which the R of Formula 2 above is trivalent arsenic, antimony, or bismuth, having one or more of its valence bonds attached to the —S—$R_{Ao}$ group of Formula 2.

I will discuss some of these examples separately.

Class I, sub-class A

1. Sodium sulphite has many uses, both in itself and as a stabilizer of unstable systems, but of itself is quite unstable toward oxidation by oxygen of the air, especially in the presence of the metal ions of copper, manganese, and iron. The measure of its deterioration by oxidation can be followed by its loss in iodine titre. The stabilization of sodium-sulphite solutions against metal catalysis by added 1,2-ethylenediamine is shown in the following Tables I and II:

TABLE I

*Stabilization of sodium sulphite solutions by the addition of 1,2-ethylenediamine*

Concentration of sodium sulphite—1:1000.
Concentration of added copper ions, when copper is added—1:200,000.

Iodine titre given in cc. of 0.015N iodine solution per 5 cc. of sodium-sulphite solution. The accuracy of the iodine titrations is ±0.2 cc.

| Ethylenediamine added | Solution | Iodine titre | | |
|---|---|---|---|---|
| | | Original | Later — after time indicated | After 10 days |
| None. | Sodium sulphite. | 4.54 | 2.91 (2 hrs.). 0.00 (3 days). | ...... |
| | Sodium sulphite+copper sulphate. | 4.45 | 0.30 (8 hrs.). | ...... |
| None. | Sodium sulphite+NaOH to give pH 9. | 3.74 | 1.68 (2 hrs.). 0.00 (2 days). | ...... |
| | Sodium sulphite+NaOH to give pH 9+copper sulphate. | 3.28 | 0.00 (2 days). | ...... |
| None. | Sodium sulphite+NH$_4$OH (5 drops per 500 cc.). | 4.23 | 3.36 (4 hrs.). 2.27 (22 hrs.). | ...... |
| | Sodium sulphite+NH$_4$OH (5 drops per 500 cc.)+copper sulphate. | 2.77 | 1.71 (4 hrs.). 0.06 (22 hrs.). | ...... |
| Ethylenediamine to give pH 9. | Sodium sulphite. | 4.50 | 4.37 (3 days). | 3.89 |
| | Sodium sulphite+copper sulphate. | 4.45 | 3.30 (3 days). | 1.01 |
| Ethylenediamine in excess (5 drops per 500 cc.). | Sodium sulphite. | 4.4. | 4.43 (3 days). | 4.41 |
| | Sodium sulphite+copper sulphate. | 4.45 | 4.30 (3 days). | 4.19 |

Table II

*Relative effects of copper, manganese, and iron on rate of oxidation of sodium sulphite, alkalinized with sodium hydroxide and with 1,2-ethylenediamine respectively*

Concentration of sodium sulphite—1:1000.
Concentration of sodium hydroxide, when used, is to give pH 9.
Concentration of ethylenediamine, when used, is 5 drops per 500 cc., which gives in excess of pH 9.

Iodine titre is given in cc. of 0.015N iodine solution per 5 cc. of sodium-sulphite solution. The accuracy of the iodine titrations is ± 0.2 cc.

| Added metal ions | Sodium sulphite solution | Iodine titre | |
|---|---|---|---|
| | | Original | After 20 hours |
| None. | With added NaOH. | 2.43 | 0.10 |
| | With added ethylenediamine. | 4.59 | 4.60 |
| $Cu^{++}$ 1:200,000. | With added NaOH. | 4.30 | 0.06 |
| | With added ethylenediamine. | 4.45 | 4.30 (After 67 hours) |
| $Mn^{++}$ 1:200,000. | With added NaOH. | 3.41 | 1.13 |
| | With added ethylenediamine. | 4.37 | 3.87 |
| $Fe^{++}$ 1:50,000. | With added NaOH. | 2.70 | 0.96 |
| | With added ethylenediamine. | 4.34 | 4.31 |

The stabilization of sodium sulphite by added 1,2-propylenediamine and by added N-phenylethylenediamine, in contrast to that produced by ethanolamine (which also has some stabilizing effect), is shown in the following Table III:

Table III

*Stabilization of sodium sulphite solutions by the addition of ethanolamine, 1,2-propylenediamine, and N-phenylethylenediamine*

Concentration of sodium sulphite—1:1000.
Concentration of added copper ions, when copper is added—1:200,000.

Iodine titre given in cc. of 0.015N iodine solution per 5 cc. of sodium-sulphite solution. The accuracy of the iodine titrations is ±0.2 cc.

Concentration of added stabilizer—5 drops per 500 cc.

| Added stabilizer | Solution | Iodine titre | | | |
|---|---|---|---|---|---|
| | | Original | After 24 hours | After 48 hours | After 120 hours |
| None. | Sodium sulphite + NaOH to give pH 9. | 4.65 | 0.21 | | |
| | Sodium sulphite + NaOH to give pH 9 + copper sulphate. | 2.22 | 1.10 | | |
| Ethanolamine. | Sodium sulphite. | 4.65 | 4.33 | 4.26 | 4.12 |
| | Sodium sulphite + copper sulphate. | 4.46 | 3.35 | 1.71 | 0.00 |
| 1,2-propylenediamine. | Sodium sulphite. | 4.50 | 4.53 | 4.37 | 4.25 |
| | Sodium sulphite + copper sulphate. | 4.63 | 4.50 | 4.33 | 4.10 |
| N-phenylethylene diamine. | Sodium sulphite. | 4.67 | 2.92 | 2.10 | 1.73 |
| | Sodium sulphite + copper sulphate. | 4.40 | 2.16 | 1.99 | 0.56 |

Similar effects are obtainable on other sulphites, as of potassium.

Class I, sub-class B

1. Sodium hyposulphite, like sodium sulphite, has various uses, both in itself and as a stabilizer of unstable systems, but of itself is also quite unstable toward oxidation by oxygen of the air, especially in the presence of the metal ions of copper, manganese, and iron. The measure of its deterioration by oxidation can also be followed by its loss in iodine titre.

The stabilization of sodium hyposulphite ($Na_2S_2O_4$) by ethylenediamine in the presence of copper ions is shown by the following Table IV:

TABLE IV

*Effect of copper on rate of oxidation of sodium hyposulphite alkalinized with sodium hydroxide and with ethylenediamine respectively*

Concentration of sodium sulphite—1:1000.
Concentration of added copper ions—1:200,000.
Iodine titre given in cc. of 0.015N iodine solution per 5 cc. of sodium-sulphite solution. The accuracy of the iodine titrations is ±0.2 cc.

| Solution | Original | Iodine titre | | |
|---|---|---|---|---|
| | | After bubbling air through— | | After standing 18 hours |
| | | For 2 hours | For 5 hours | |
| Sodium hyposulphite+CuSO$_4$+NaOH to give pH 9.6 | 4.06 | 3.80 | 0.10 | 0.10 |
| Sodium hyposulphite+CuSO$_4$+ethylenediamine to give pH 9.6 | 4.06 | 4.07 | 4.04 | 4.16 | page 4, first column, lines 24 to 35 inclusive, insert vertical marginal lines in the table; and second column, lines 23, 36-37 and 72, for "catalysts" read catalysis; same page and column, line 28, in the formula, for " $\rightleftharpoons$ " read $\rightarrow$; and that the said Letters Patent should be read with this correction therein that the same may conform to the record of the case in the Patent Office.

Signed and sealed this 24th day of January, A. D. 1939.

Henry Van Arsdale (Seal)   Acting Commissioner of Patents.